Patented Nov. 10, 1925.

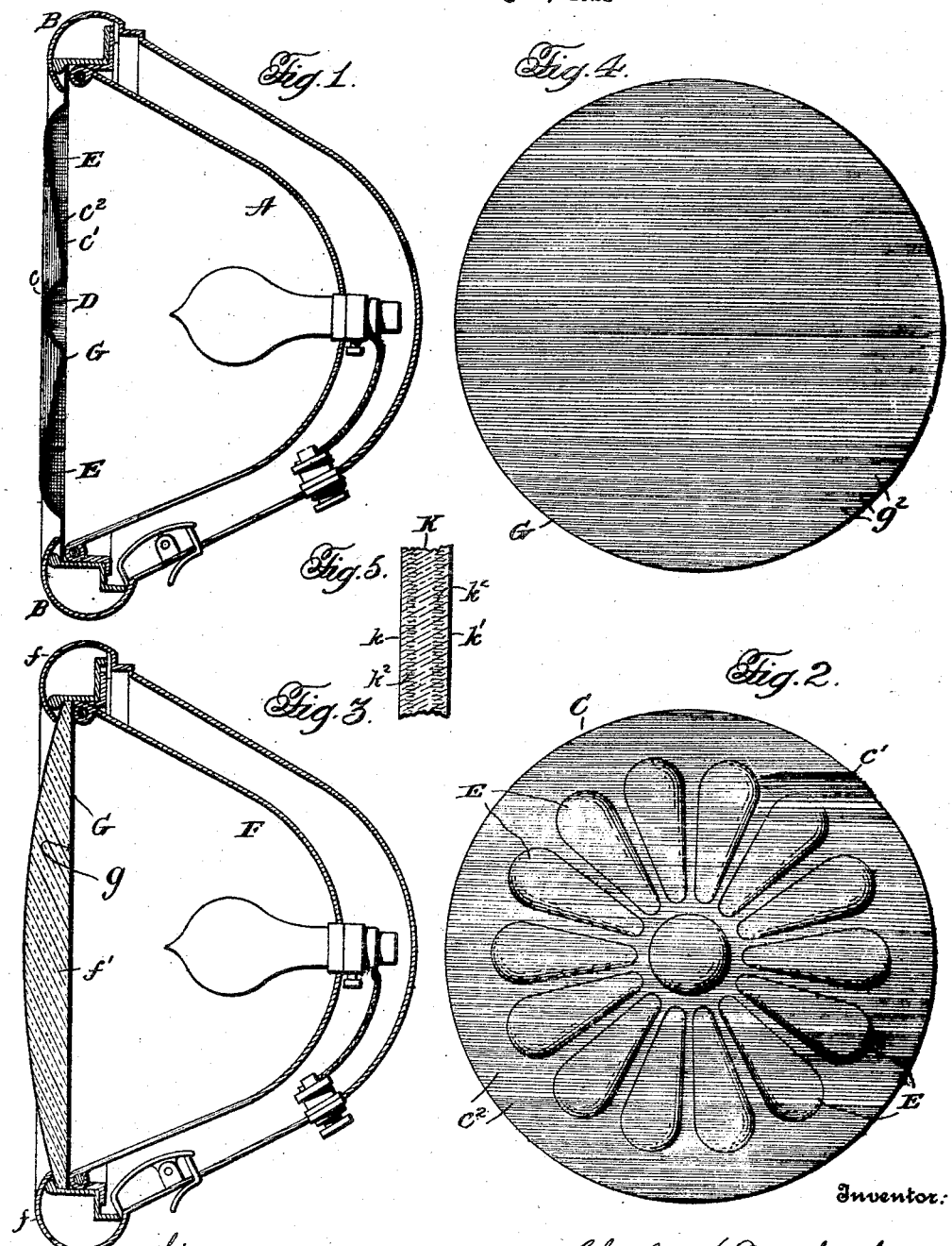

1,561,010

UNITED STATES PATENT OFFICE.

CHARLES H. MUCKENHIRN, OF DETROIT, MICHIGAN.

HEADLIGHT.

Application filed August 4, 1921. Serial No. 489,705.

*To all whom it may concern:*

Be it known that I, CHARLES H. MUCKENHIRN, a citizen of the United States, residing at Detroit, in the county of Wayne and State of Michigan, have invented certain new and useful Improvements in Headlights, of which the following is a specification, reference being had therein to the accompanying drawing.

This invention relates to improvements in lights, and more especially headlights for motor vehicles and the like.

The object of the present invention is to provide improved means of a simple and inexpensive nature adapted to be readily applied to different styles of headlights and which, irrespective of the particular kind of light, the focal adjustment, angle of tilt, character of diffusing surface, etc., thereof, will modify or control the light waves to produce a clear diffused light on the road surface without glare.

The invention comprehends an improved inexpensive front or lens for headlights composed of a thin film-like material, such as pyroxylin, celluloid, or the like, and provided with lines approximating interference or refracting lines, which function to break up the light waves and eliminate or neutralize those rays of a brilliant or penetrating character, which hurt the eye, or are responsible for the glare. The invention further contemplates an improved front or lens of this character provided with light diffusing or controlling means in the form of protuberances, bulges, or points.

The invention, with other objects and advantages thereof, and the particular construction, combination and arrangement of parts comprising the same, will be understood from the hereinafter contained detailed description, when considered in connection with the accompanying drawings, forming part hereof, and illustrating embodiments of the invention.

In the drawings:—

Figure 1 is a vertical section through a headlight equipped with a front or lens constructed in accordance with the present invention.

Figure 2 is a detail elevation of the front.

Figure 3 is a vertical section of a headlight showing one of the standard types of lens with a slightly modified form of my improved front applied thereto.

Figure 4 is an elevation of the form of front illustrated in Fig. 3.

Figure 5 is a transverse section illustrating another embodiment of the invention.

Referring to a detailed description of the drawings, particularly Figs. 1 and 2, A designates a headlight of conventional form having lens clamping means B, which may be of any suitable construction.

C designates my improved front or lens composed of a thin, flexible sheet of pyroxylin, celluloid or like material, having a polished surface and provided with interference or refracting lines. In the present instance, the lens or front C is shown with a polished surface and substantially transparent at one side $c$, and provided on its other face $c'$ with interference or refracting lines $c^2$ formed by parallel scratches, miniature prisms, or prismatic parallelograms. The front C is provided with light diffusing or controlling means, which in the particular construction shown, comprises a central bulge D and a series of radially extending elongated pear-shaped bulges E.

The front or lens C, which is adapted to be supported with its polished side $c$ facing toward the front, as shown (Figs. 1 and 2), and held in place by the clamping means B, serves to modify or control the light waves so that a clear diffused light, without glare results, the interference or refracting lines $c^2$ functioning to break up the light waves and to eliminate or neutralize the glare-producing rays.

My improved front or lens is adapted to be employed alone as the front or lens for headlights, as indicated in Fig. 1 of the drawings, or to be associated and used in conjunction with other headlight lenses, as indicated in Fig. 3. In Fig. 3 of the drawings, F designates a headlight having lens-retaining means $f$ and provided with a conventional form of lens $f'$. G designates my improved front or lens positioned back of the lens $f'$ to extend over the rear face thereof, and held in position by the retaining means $f$, said front or lens having a polished surface $g$ at one side and provided on its other face with interference or refracting lines $g^2$. The front or lens G, shown in this instance, represents a slightly modified form, the construction being the same as that previously described, except that it is not provided with light diffusing bulges.

One method by which the front or lens may be economically manufactured from pyroxylin is as follows:

A quantity of pyroxylin in a cake or "heat" form is sliced into sheets of the desired thickness. In practicing the invention, sheets fifteen one-thousandths of an inch thick have been used. The sheets are simultaneously subjected to high heat and pressure, about three thousand pounds pressure per square inch, with a heat of about three hundred degrees or more for a period of about fifteen minutes, the sheets being placed between highly polished copper and nickel-plated steel plates. A plurality of pressure plates are employed and the sheets are arranged in pairs between the plates, each pair of sheets being placed together between two of the pressure plates. This treatment of two sheets together between the highly polished surfaces of two pressure plates results in giving the sheets a high polish on their outer sides which are next to the polished surfaces of the pressure plates, and lined surfaces at their opposing inner sides, the marks made by the minute indentations of the cutting or slicing knife during the sheeting operation being developed or brought out in this way, and resulting in a surface formed of parallel scratches, miniature prisms, or miniature prismatic parallelograms. The sheets may be readily provided with the diffusing protuberances or points by forming the bulges under a temperature slightly lower than the temperature at which the sheets have been previously treated, a temperature sufficient to soften the sheet but not enough to affect the polished and lined surfaces thereof.

The invention also comprehends a lens or front composed of a thin film like body of pyroxylin having polished surfaces at both sides thereof with the interference or refracting lines appearing in the material. Such a modified construction is illustrated in a general way, on an enlarged scale, in Fig. 5 of the drawings, in which K designates the front or lens having polished surfaces $k$, $k'$ at the sides thereof, and $k^2$ the interference or refracting lines. This modified form of front or lens is made by placing two sheets of pyroxylin, which have knife marks at one side thereof and which have been polished on either side by being placed between highly polished steel plates and subjected to heat and pressure, face to face and then submitting them to heat and pressure. By this treatment, the "knife marks" forming the refraction lines, will be developed or appear on the two surfaces of the sheets that lie against each other while the outer surfaces of the sheets having been again subjected to the highly polishing contact of the steel plates retain their polish. The pair of sheets so treated with their lined faces placed against each other are secured together in any suitable way so that a relatively thin film like body is provided having polished outer faces and refraction lines appearing therein.

The special constructions of lens or front hereinbefore described, having the interference or refracting lines can be produced at low cost. The lens or front functions in the manner set forth regardless of the particular kind of headlight with which it may be employed, the focal adjustment, angle of tilt, character of diffusing surface, or lens thereof, and can be readily applied to various styles of headlights.

While specific embodiments of the invention are illustrated in the drawings, I desire it to be understood that changes and variations in the particular constructions illustrated, and the embodiment of the invention in other forms, as will appeal to those skilled in the art and falling within the scope of the appended claims, may be practiced without departing from the spirit of the invention.

What I claim is:—

1. A front for lights comprising a thin film-like body having a surface at one side thereof formed of parallel scratches functioning as light refracting lines.

2. A front for lights composed of a thin film-like body having a polished surface at one side thereof and at its other side a surface formed of parallel scratches functioning as light refracting lines.

In testimony whereof I hereunto affix my signature.

CHARLES H. MUCKENHIRN.